United States Patent
Cheng et al.

(10) Patent No.: US 11,347,977 B2
(45) Date of Patent: May 31, 2022

(54) LATERAL AND LONGITUDINAL FEATURE BASED IMAGE OBJECT RECOGNITION METHOD, COMPUTER DEVICE, AND NON-TRANSITORY COMPUTER READABLE STORAGE MEDIUM

(71) Applicant: HANGZHOU HIKVISION DIGITAL TECHNOLOGY CO., LTD., Hangzhou (CN)

(72) Inventors: Zhanzhan Cheng, Hangzhou (CN); Yi Niu, Hangzhou (CN); Binghua Luo, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 8 days.

(21) Appl. No.: 16/756,427

(22) PCT Filed: Sep. 28, 2018

(86) PCT No.: PCT/CN2018/108301
§ 371 (c)(1),
(2) Date: Apr. 15, 2020

(87) PCT Pub. No.: WO2019/076188
PCT Pub. Date: Apr. 25, 2019

(65) Prior Publication Data
US 2020/0334504 A1    Oct. 22, 2020

(30) Foreign Application Priority Data
Oct. 18, 2017    (CN) .......................... 201710969721.7

(51) Int. Cl.
*G06K 9/66*    (2006.01)
*G06K 9/62*    (2022.01)
(Continued)

(52) U.S. Cl.
CPC .......... *G06K 9/6288* (2013.01); *G06K 9/629* (2013.01); *G06K 9/6267* (2013.01); *G06V 10/40* (2022.01);
(Continued)

(58) Field of Classification Search
CPC .. G06K 9/00; G06K 9/00402; G06K 9/00409; G06K 9/00416; G06K 9/00422;
(Continued)

(56) References Cited

U.S. PATENT DOCUMENTS

| 10,891,476 B2 * | 1/2021 | Wang ................... G06K 9/6267 |
| 2007/0189607 A1 * | 8/2007 | Chen ....................... G06K 9/46 382/199 |

(Continued)

FOREIGN PATENT DOCUMENTS

| CN | 101833653 | 9/2010 |
| CN | 101944174 | 1/2011 |

(Continued)

OTHER PUBLICATIONS

International Search Report and Written Opinion issued in corresponding PCT Application No. PCT/CN2018/108301, dated Jan. 7, 2019 (English Translation of International Search Report provided).

(Continued)

*Primary Examiner* — Eric Rush
(74) *Attorney, Agent, or Firm* — Norton Rose Fulbright US LLP (57) ABSTRACT

An image object recognition method, apparatus, and computer device are provided. The image object recognition method includes: performing feature extraction in the direction of a horizontal angle of view and in the direction of a vertical angle of view of an image respectively, to extract a lateral feature sequence and a longitudinal feature sequence of the image; fusing the lateral feature sequence and the (Continued)

longitudinal feature sequence to obtain a fused feature; activating the fused feature by using a preset activation function to obtain an image feature; and recognizing an object in the image by decoding the image feature. This solution can improve the efficiency of the object recognition.

12 Claims, 5 Drawing Sheets

(51) Int. Cl.
    *G06V 10/40* (2022.01)
    *G06V 20/62* (2022.01)
    *G06V 30/18* (2022.01)
    *G06V 10/80* (2022.01)
    *G06V 30/10* (2022.01)
    *G06V 10/72* (2022.01)
(52) U.S. Cl.
    CPC ............ *G06V 10/72* (2022.01); *G06V 10/806* (2022.01); *G06V 20/62* (2022.01); *G06V 20/63* (2022.01); *G06V 30/10* (2022.01); *G06V 30/18* (2022.01); *G06V 30/18019* (2022.01)
(58) Field of Classification Search
    CPC .......... G06K 9/00442; G06K 9/00449; G06K 9/00456; G06K 9/00463; G06K 9/00476; G06K 9/00483; G06K 9/00496; G06K 9/00503; G06K 9/00523; G06K 9/00536; G06K 9/18; G06K 9/3208; G06K 9/325; G06K 9/3258; G06K 9/3266; G06K 9/3275; G06K 9/3283; G06K 9/46; G06K 9/48; G06K 9/481; G06K 9/6202; G06K 9/6203; G06K 9/6267; G06K 9/6288; G06K 9/6289; G06K 9/629; G06K 9/68; G06K 9/72; G06K 2209/01; G06K 2209/011; G06K 2209/013; G06K 2209/15; G06K 2209/29; G06V 10/36; G06V 10/40; G06V 10/44; G06V 10/443; G06V 10/70; G06V 10/72; G06V 10/74; G06V 10/77; G06V 10/7715; G06V 10/80; G06V 10/803; G06V 10/806; G06V 20/62; G06V 20/63; G06V 30/00; G06V 30/10; G06V 30/18; G06V 30/18019; G06V 30/1904; G06V 30/333
    USPC ........ 382/100–103, 105, 115, 155, 156, 158, 382/159, 181, 183, 185–187, 190, 382/195–201, 209, 216–218, 224, 382/229–231, 276–279, 289–292, 321
    See application file for complete search history.

(56) References Cited

U.S. PATENT DOCUMENTS

| | | | |
|---|---|---|---|
| 2010/0226533 | A1* | 9/2010 | Bharath .................... G06K 9/52 382/103 |
| 2010/0284604 | A1* | 11/2010 | Chrysanthakopoulos .................. G06K 9/52 382/153 |
| 2011/0158510 | A1* | 6/2011 | Aguilar .............. G06K 9/00718 382/159 |
| 2012/0027305 | A1 | 2/2012 | Kim et al. |
| 2013/0272579 | A1 | 10/2013 | Burry et al. |
| 2018/0053296 | A1* | 2/2018 | Hattori ................. G06K 9/4604 |
| 2018/0173946 | A1* | 6/2018 | Matsuki ............... G06K 9/3233 |

FOREIGN PATENT DOCUMENTS

| | | |
|---|---|---|
| CN | 103903238 | 7/2014 |
| CN | 104091348 | 10/2014 |
| CN | 104268833 | 1/2015 |
| CN | 104978561 | 10/2015 |
| CN | 105740876 | 7/2016 |
| CN | 105893947 | 8/2016 |
| CN | 106156768 | 11/2016 |
| CN | 106407927 | 2/2017 |
| CN | 106529446 | 3/2017 |
| CN | 106803090 | 6/2017 |
| CN | 106960206 | 7/2017 |
| CN | 106991472 | 7/2017 |
| CN | 107103331 | 8/2017 |
| CN | 107122712 | 9/2017 |
| EP | 3058510 | 8/2016 |
| WO | WO 2014/183259 | 11/2014 |
| WO | WO 2017/165538 | 9/2017 |

OTHER PUBLICATIONS

Office Action issued in Corresponding Chinese Application No. 201710969721.7, dated Mar. 10, 2021 (English Translation provided).

Extended European Search Report issued in Corresponding European Application No. 18867472.5, dated Nov. 23, 2020.

* cited by examiner

LATERAL AND LONGITUDINAL FEATURE BASED IMAGE OBJECT RECOGNITION METHOD, COMPUTER DEVICE, AND NON-TRANSITORY COMPUTER READABLE STORAGE MEDIUM

CROSS REFERENCE TO RELATED APPLICATIONS

The present application is a national phase application under 35 U.S.C. § 371 of International Application No. PCT/CN2018/108301, filed Sep. 28, 2018, which claims the benefit of priority to Chinese Patent Application No. 201710969721.7, filed with the China National Intellectual Property Administration on Oct. 18, 2017 and entitled "Image Object Recognition Method, Apparatus, and Computer Device", each of which are incorporated herein by reference in their entirety.

TECHNICAL FIELD

The present application relates to the field of machine vision, and in particular, to an image object recognition method, apparatus, and a computer device.

BACKGROUND

Image object recognition mainly relates to locating and identifying objects in images. In the field of image processing, three conventional solutions to object recognition are template matching approach, a feature point matching approach and a deep learning approach. However, in actual application scenarios, the object recognition may encounter objects that are inclined, rotated or curved. The three approaches implement the object recognition based on feature information of an object specified in advance. The feature information of the specified object is often limited to feature information of an object with a fixed posture. If the object in the image is inclined or deformed, the above three approaches will not recognize the object accurately.

One solution proposed to this problem is an image detection approach capable of recognizing an object from multiple angles. An angle detector is adapted to identify the angle of the image before performing the object recognition. An object classifier generation unit generates an object classification unit adapted to that angle, which is then used to detect a specified object from an image.

However, if there are objects inclined at different angles in an image, an object classification unit has to be generated for each of the angles of the object. Further, these angles of the objects must be identified in advance. Such operations may be slow if they are run in sequence, while the operations require a processor with high processing capabilities if they are run in parallel. Therefore, such object recognition solution has a low efficiency.

SUMMARY

The objective of embodiments of the present application is to propose an image object recognition method, apparatus, and a computer device, to improve the efficiency of object recognition. The specific technical solutions are provided below.

In a first aspect, an embodiment of the present application provides an image object recognition method, which includes:

performing feature extraction in the direction of a horizontal angle of view and in the direction of a vertical angle of view of an image respectively, to extract a lateral feature sequence and a longitudinal feature sequence of the image;

fusing the lateral feature sequence and the longitudinal feature sequence to obtain a fused feature;

activating the fused feature by using a preset activation function to obtain an image feature; and recognizing an object in the image by decoding the image feature.

Optionally, performing the feature extraction in the direction of the horizontal angle of view and in the direction of the vertical angle of view of the image respectively to extract the lateral feature sequence and the longitudinal feature sequence of the image, includes:

performing a convolution operation in the direction of the horizontal angle of view of the image to obtain a first convolution result, which is used as the lateral feature sequence; and performing a convolution operation in the direction of the vertical angle of view of the image to obtain a second convolution result, which is used as the longitudinal feature sequence.

Optionally, before fusing the lateral feature sequence and the longitudinal feature sequence to obtain the fused feature, the method further includes:

performing a convolution operation on the image based on the lateral feature sequence and the longitudinal feature sequence, to determine a deformation parameter indicating weights of the lateral feature sequence and the longitudinal feature sequence associated with image deformation.

Fusing the lateral feature sequence and the longitudinal feature sequence to obtain the fused feature includes:

fusing the lateral feature sequence and the longitudinal feature sequence by using a weighted sum method and the deformation parameter to obtain the fused feature.

Optionally, performing the feature extraction in the direction of the horizontal angle of view and in the direction of the vertical angle of view of the image respectively to extract the lateral feature sequence and the longitudinal feature sequence of the image, includes:

performing a convolution operation in the direction of the horizontal angle of view of the image to obtain a first convolution result;

reversely arranging row vectors in the first convolution result to obtain a first reverse sequence;

using the first convolution result and the first reverse sequence as the lateral feature sequence;

performing a convolution operation in the direction of the vertical angle of view of the image to obtain a second convolution result;

reversely arranging column vectors in the second convolution result to obtain a second reverse sequence; and using the second convolution result and the second reverse sequence as the longitudinal feature sequence.

Optionally, before fusing the lateral feature sequence and the longitudinal feature sequence to obtain the fused feature, the method further includes:

performing a convolution operation on the image based on the first convolution result and the first reverse sequence in the lateral feature sequence and the second convolution result and the second reverse sequence in the longitudinal feature sequence, to determine a deformation parameter indicating weights of the first convolution result, the first reverse sequence, the second convolution result and the second reverse sequence associated with image deformation.

Fusing the lateral feature sequence and the longitudinal feature sequence to obtain the fused feature includes:

fusing the first convolution result, the first reverse sequence, the second convolution result and the second reverse sequence by using a weighted sum method and the deformation parameter to obtain the fused feature.

Optionally, fusing the lateral feature sequence and the longitudinal feature sequence to obtain the fused feature, includes:

concatenating the lateral feature sequence and the longitudinal feature sequence to obtain the fused feature.

In a second aspect, an embodiment of the present application provides an image object recognition apparatus, which includes:

a feature extraction module, configured for performing feature extraction in the direction of a horizontal angle of view and in the direction of a vertical angle of view of an image respectively, to extract a lateral feature sequence and a longitudinal feature sequence of the image;

a fusion module, configured for fusing the lateral feature sequence and the longitudinal feature sequence to obtain a fused feature;

an activation module, configured for activating the fused feature by using a preset activation function to obtain an image feature; and a decoding module, configured for recognizing an object in the image by decoding the image feature.

Optionally, the feature extraction module is specifically configured for:

performing a convolution operation in the direction of the horizontal angle of view of the image to obtain a first convolution result, which is used as the lateral feature sequence; and performing a convolution operation in the direction of the vertical angle of view of the image to obtain a second convolution result, which is used as the longitudinal feature sequence.

Optionally, the apparatus further includes:

a first deformation parameter determination module, configured for performing a convolution operation on the image based on the lateral feature sequence and the longitudinal feature sequence, to determine a deformation parameter indicating weights of the lateral feature sequence and the longitudinal feature sequence associated with image deformation.

The fusion module is specifically configured for:

fusing the lateral feature sequence and the longitudinal feature sequence by using a weighted sum method and the deformation parameter to obtain the fused feature.

Optionally, the feature extraction module is specifically configured for:

performing a convolution operation in the direction of the horizontal angle of view of the image to obtain a first convolution result;

reversely arranging row vectors in the first convolution result to obtain a first reverse sequence;

using the first convolution result and the first reverse sequence as the lateral feature sequence;

performing a convolution operation in the direction of the vertical angle of view of the image to obtain a second convolution result;

reversely arranging column vectors in the second convolution result to obtain a second reverse sequence; and using the second convolution result and the second reverse sequence as the longitudinal feature sequence.

Optionally, the apparatus further includes:

a second deformation parameter determination module, configured for performing a convolution operation on the image based on the first convolution result and the first reverse sequence in the lateral feature sequence and the second convolution result and the second reverse sequence in the longitudinal feature sequence, to determine a deformation parameter indicating weights of the first convolution result, the first reverse sequence, the second convolution result and the second reverse sequence associated with image deformation.

The fusion module is specifically configured for:

fusing the first convolution result, the first reverse sequence, the second convolution result and the second reverse sequence by using a weighted sum method and the deformation parameter to obtain the fused feature.

Optionally, the fusion module is specifically configured for:

concatenating the lateral feature sequence and the longitudinal feature sequence to obtain the fused feature.

In a third aspect, an embodiment of the present application provides a computer device including a processor and a memory.

The memory is configured to store a computer program.

The processor is configured to, when executing the computer program stored in the memory, perform steps of the method in the first aspect.

It can be seen from the above, in the solutions provided by the embodiments of the present application, feature extraction in the direction of the horizontal angle of view and in the direction of the vertical angle of view of the image is performed to extract a lateral feature sequence and a longitudinal feature sequence respectively. The lateral feature sequence and the longitudinal feature sequence are fused to obtain a fused feature. An activation function is applied to the fused feature to obtain an image feature, which is then decoded to recognize an object in the image. For an inclined object, the object has different components in different angle of view. Therefore, the feature extraction along different angle of views and feature fusion are implemented to obtain the fused feature, i.e., the whole feature information of the object in the angle of views. The activation function is then applied to the fused feature to obtain the image feature that can be matched with the template. Finally, the object is recognized through the decoding. The method does not require advance determination of the angle of the inclined object and thus does not require the generation of various object classifiers for objects with different angles. This simplifies the operations of the object recognition, and improves the efficiency of the object recognition while ensuring the accuracy of the object recognition.

BRIEF DESCRIPTION OF THE DRAWINGS

In order to describe the technical solutions of the embodiments of the present application and the prior art more clearly, a brief description of the accompanying drawings used in the embodiments and the prior art is given. Obviously, the drawings described below are for only some of embodiments of the present application. Those skilled in the art can also obtain other drawings based on the drawings herein without any creative efforts.

DETAILED DESCRIPTION

In the following detailed description, specific details are set forth in connection with drawings to provide a clear and thorough understanding of the objective, technical solutions and advantages of the present application. Obviously, the described embodiments are only some, instead of all, of the embodiments of the present application. Any other embodiments obtained based on the embodiments herein by those skilled in the art without any creative efforts fall into the scope of protection of the present application.

The present application will be described in detail below in connection with specific embodiments.

Figure 1:
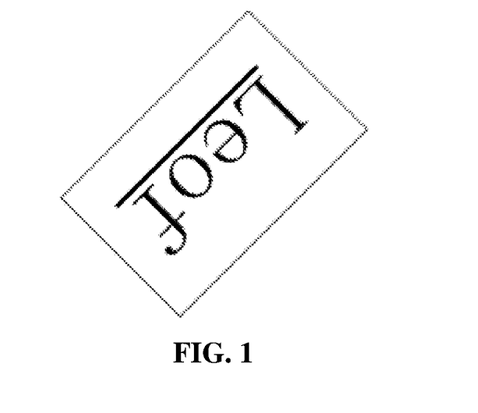
FIG. 1 shows an example of an inclined object in actual application of object recognition.

In actual application of object recognition, there are usually inclined, rotated, perspective or curved objects, such as an inverted text as shown in FIG. 1. Conventional object recognition methods cannot accurately recognize the inclined, rotated, perspective or curved objects due to their limitation to fixed templates. Therefore, embodiments of the present application provide an image object recognition method, apparatus, and a computer device to accurately recognize such objects and improve the efficiency of the object recognition. The image object recognition method provided by an embodiment of the present application is firstly described below.

The image object recognition method provided by the embodiment of the present application is applicable to a device such as a computer or camera with image recognition functionality, which include at least a core processing chip with data processing capability. The image object recognition method provided by the embodiment of the present application may be implemented by but not limited to a software circuit, a hardware circuit or a logic circuit disposed in said device.

Figure 2:
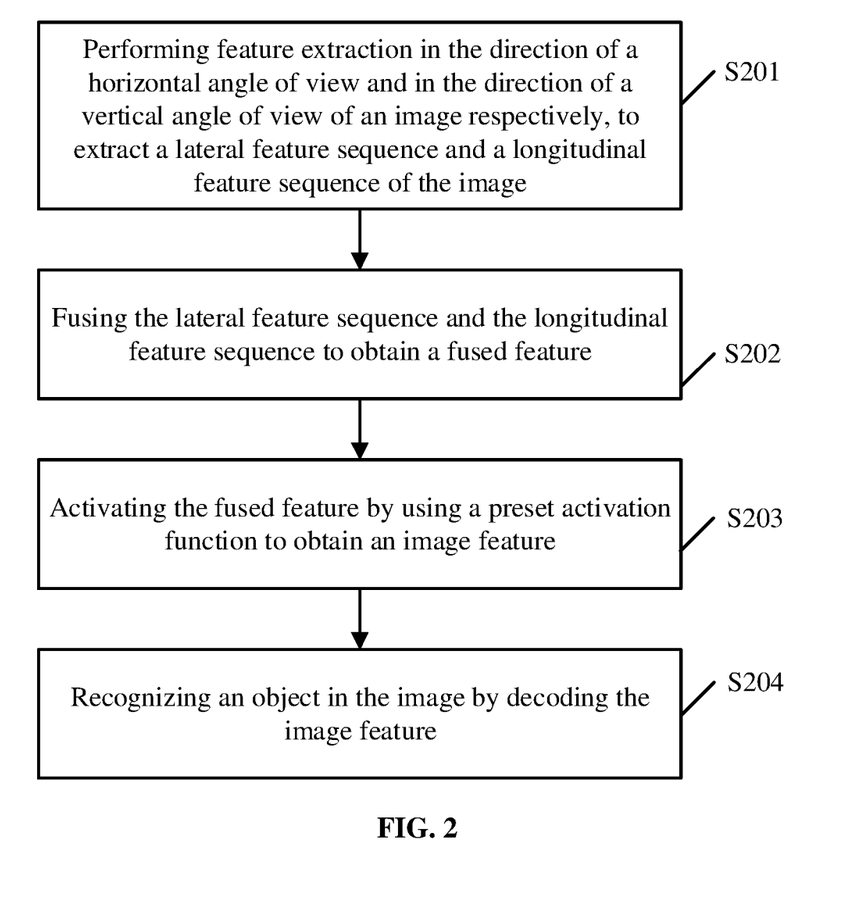
FIG. 2 is a schematic flowchart of an image object recognition method according to an embodiment of the present application.

FIG. 2 shows an image object recognition method provided by the embodiment of the present application. The image object recognition method may include the following steps.

At step S201, feature extraction is performed on an image in the direction of the horizontal angle of view and in the direction of the vertical angle of view of the image respectively to obtain a lateral feature sequence and a longitudinal feature sequence of the image.

Figure 3A:
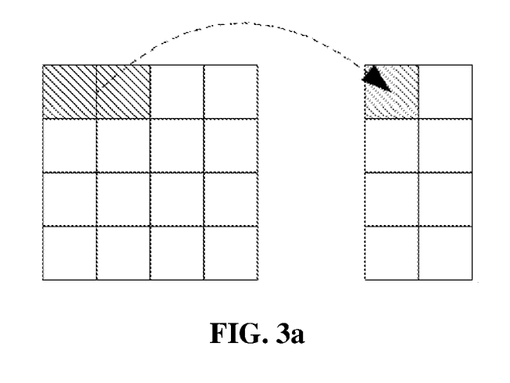
FIG. 3a is a schematic diagram of lateral convolution of an image according to an embodiment of the present application.
Figure 3B:
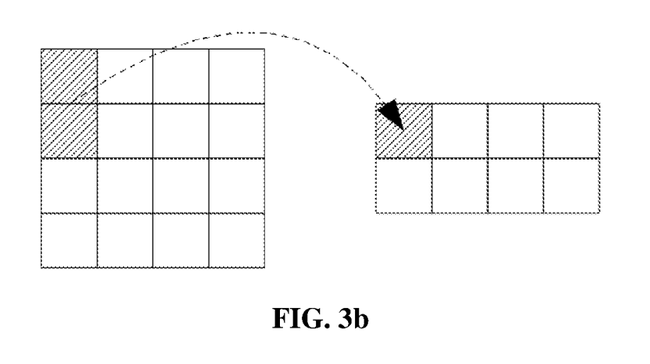
FIG. 3b is a schematic diagram of longitudinal convolution of an image according to an embodiment of the present application.

The feature extraction can be performed on an image in two directions of the angle of view. That is, the feature extraction can be performed in the direction of the horizontal angle of view and be performed in the direction of the vertical angle of view of the image. The feature extraction in the direction of the horizontal angle of view of the image may be may be implemented by a convolution in the direction of the horizontal angle of view of the image, which is called a lateral convolution, as shown in FIG. 3a. The feature extraction in the direction of the vertical angle of view of the image may be implemented by a convolution in the direction of the vertical angle of view of the image, which is called a longitudinal convolution, as shown in FIG. 3b. Of course, the feature extraction may also be performed using other approaches that are capable of extracting features from an image in the direction of the horizontal angle of view of the image and in the direction of the vertical angle of view of the image, which will not be described here.

In order to further improve the processing efficiency, the feature extraction along the two angle of views may be performed in parallel. The lateral feature sequence and the longitudinal feature sequence of the image can be obtained through the feature extraction. The lateral feature sequence is a feature sequence with the number of columns equivalent to 1, and the longitudinal feature sequence is a feature sequence with the number of rows equivalent to 1. Here, the number of columns or rows equivalent to 1 does not mean that there only one column or row in the feature sequence, but only mean that the feature sequence can be processed as a whole.

At step S202, the lateral feature sequence and the longitudinal feature sequence are fused to obtain a fused feature.

The lateral feature sequence and the longitudinal feature sequence are sets of features of the image in different angle of views. Recognizing the object in the image requires whole feature information of the image. Thus, the lateral feature sequence and the longitudinal feature sequence need to be fused to obtain the fused feature that has the whole feature information of the image. The feature fusion may be performed to obtain the fused feature by concatenating the lateral feature sequence and the longitudinal feature sequence, referred to as Concat fusion. The feature fusion may also be performed to obtain the fused feature by adding the corresponding feature values together, an element-wise addition referred to as Eltwise Add. The feature fusion may also be performed to obtain the fused feature by a weighted sum method with weights representing deformation levels for the lateral feature sequence and the longitudinal feature sequence. Of course, the three feature fusion manners are only examples, and other feature fusion manners can also be used to fuse the lateral and vertical feature sequences, which will not be described herein.

At step S203, the fused feature is activated by using a preset activation function to obtain an image feature.

The obtained fused feature can reflect the whole feature information of the image. However, features of a same object are often scattered, and it is necessary to retain and map the features of objects by applying the preset activation function to the fused feature, to obtain the image feature. The obtained image feature may be matched with a template. The preset activation function may be a non-linear activation function, such as a tanh function, a Sigmoid function, or a ReLU function, or may be an activation function of another type, which will not be listed herein.

At step S204, the image feature is decoded to recognize an object in the image.

After the activation, the obtained image feature may be decoded by a subsequent decoder. Different decoders may be used for different objects. For example, if the specified object to be identified is a text, an Attention decoder may be selected. Of course, a conventional object classifier may also be selected to recognize the class of the object based on confidence.

In the embodiment of the present application, feature extraction in the direction of the horizontal angle of view and in the direction of the vertical angle of view of the image is performed to extract a lateral feature sequence and a longitudinal feature sequence respectively. The lateral feature sequence and the longitudinal feature sequence are fused to obtain a fused feature. An activation function is applied to the fused feature to obtain an image feature, which is then decoded to recognize an object in the image. For an inclined object, the object has different components in different angle of view. Therefore, the feature extraction along different angle of views and feature fusion are implemented to obtain the fused feature, i.e., the whole feature information of the object in the angle of views. The activation function is then applied to the fused feature to obtain the image feature that can be matched with the template. Finally, the object is recognized through the decoding. The method does not require advance determination of the angle of the inclined object and thus does not require the generation of various object classifiers for objects with different angles. This simplifies the operations of the object recognition, and improves the efficiency of the object recognition while ensuring the accuracy of the object recognition.

Figure 4:
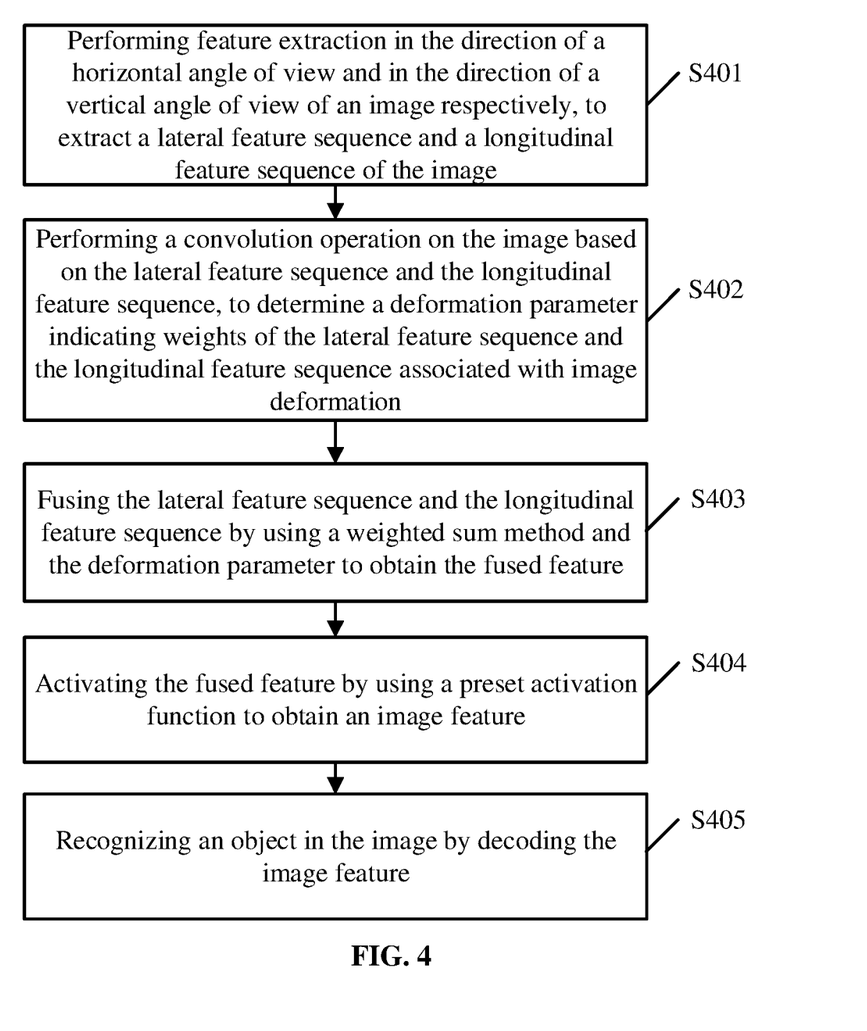
FIG. 4 is another schematic flowchart of an image object recognition method according to an embodiment of the present application.

On the basis of the embodiment shown in FIG. 2, an embodiment of the present application further provides another image object recognition method. As shown in FIG. 4, the image object recognition method includes the following steps.

At step S401, feature extraction is performed on an image in the direction of the horizontal angle of view and in the direction of the vertical angle of view of the image respectively to obtain a lateral feature sequence and a longitudinal feature sequence of the image.

In this embodiment, in order to improve the efficiency of the feature extraction, a convolution operation is performed in the direction of the horizontal angle of view of the image to obtain a first convolution result, which is determined as the lateral feature sequence. A convolution operation is performed on the image in the direction of the vertical angle of view of the image to obtain a second convolution result, which is determined as the longitudinal feature sequence. That is, the lateral feature sequence includes only the convolution result from the convolution operation performed on the row vectors of the image, and the longitudinal feature sequence includes only the convolution result from the convolution operation performed on column vectors of the image.

At step S402, a convolution operation is performed on the image based on the lateral feature sequence and the longitudinal feature sequence, to extract a deformation parameter indicating weights of the lateral feature sequence and the longitudinal feature sequence associated with the image deformation.

For each of the obtained lateral feature sequence and longitudinal feature sequence, attributes such as the length and parameters of the feature sequence represent the proportion of the feature in the direction of the angle of view, i.e., the weight of the feature sequence in the direction of the angle of view associated with the image deformation. The weights for the angle of views of the image can be extracted by applying a lateral convolution operation and a longitudinal convolution operation to the image.

At step S403, the lateral feature sequence and the longitudinal feature sequence are fused by computing weighted sums with the deformation parameter to obtain the fused feature.

The deformation parameter represents the weights of the feature sequences in the direction of the angle of views associated with the image deformation. Thus, the feature sequences corresponding to different angle of views may be fused by computing the weighted sums. The obtained fused feature can reflect the deformation degree in each direction of the angle of view. For example, the feature extraction produces a lateral feature sequence of v and the longitudinal feature sequence of h, and a deformation parameter of (0.6, 0.4) is obtained by the convolution operation. Thus, each of feature values in the fused feature is calculated as $0.6 \times v_{ij} + 0.4 \times h_{ig}$.

At step S404, the fused feature is activated by using a preset activation function to obtain an image feature.

At step S405, the image feature is decoded to recognize an object in the image.

Steps S404 and S405 in this embodiment are the same as steps S203 and S204 in the embodiment shown in FIG. 2, which will not be described herein.

In the embodiment of the present application, feature extraction in the direction of the horizontal angle of view and in the direction of the vertical angle of view of the image is performed to extract a lateral feature sequence and a longitudinal feature sequence respectively. The lateral feature sequence and the longitudinal feature sequence are fused to obtain a fused feature. An activation function is applied to the fused feature to obtain an image feature, which is then decoded to recognize an object in the image. For an inclined object, the object has different components in different angle of view. Therefore, the feature extraction along different angle of views and feature fusion are implemented to obtain the fused feature, i.e., the whole feature information of the object in the angle of views. The activation function is then applied to the fused feature to obtain the image feature that can be matched with the template. Finally, the object is recognized through the decoding. The method does not require advance determination of the angle of the inclined object and thus does not require the generation of various object classifiers for objects with different angles. This simplifies the operations of the object recognition, and improves the efficiency of the object recognition while ensuring the accuracy of the object recognition. In addition, an convolution operation is applied to the lateral feature sequence and the longitudinal feature sequence to obtain a deformation parameter representing the weights of the lateral feature sequence and the longitudinal feature sequence associated with the image deformation. The features are fused by means of the weighted sum method. This allows the fused feature to reflect the deformation degrees of the object in different directions of angle of views more accurately, which further improves the accuracy of the object recognition.

In order to ensure a high accuracy of the object recognition, in the embodiment of the present application, after performing the convolution operation on row vectors of the image in the direction of the horizontal angle of view of the image to obtain the first convolution result, row vectors in the first convolution result may be reversely arranged to obtain a first reverse sequence. Similarly, after performing the convolution operation on the column vectors of the image in the direction of the vertical angle of view of the image to obtain the second convolution result, column vectors in the second convolution result may be reversely arranged to obtain a second reverse sequence. The first convolution result and the first reverse sequence are determined as the lateral feature sequence, and the second convolution result and the second reverse sequence are determined as the longitudinal feature sequence. The forward and reverse arrangements of the convolution results in the lateral feature sequence and the longitudinal feature sequence can represent the inclination of the object more intuitively. The embodiment is described below by way of an example.

Figure 5:
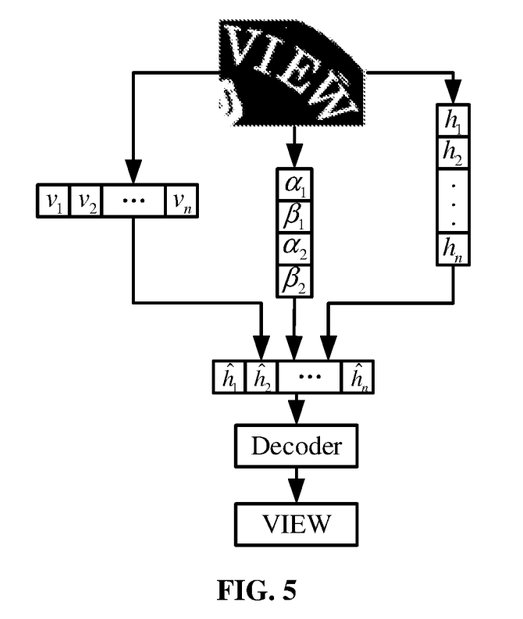
FIG. 5 shows an example of object recognition according to the embodiment of the present application.

As shown in FIG. 5, an example of the object recognition according to the embodiment of the present application is depicted.

At the first step, the row vector of the image in the direction of the horizontal angle of view of the image are subjected to the lateral convolution to obtain the first convolution result, which is $\vec{h}:(h_1, h_2, \ldots, h_n)^T$ as shown in FIG. 5. The row vectors in the first convolution result are reversely arranged to obtain a first reverse sequence $\bar{h}:(h_n, h_{n-1}, \ldots, h_1)^T$. The first convolution result and the first reverse sequence are determined as the lateral feature sequence.

At the second step, the column vectors of the image in the direction of the vertical angle of view of the image are subjected to the convolution operation to obtain the second convolution result, which is $\vec{v}:(v_1, v_2, \ldots, v_n)$ as shown in FIG. 5. The column vectors in the second convolution result are reversely arranged to obtain a second reverse sequence $\bar{v}:(v_n, v_{n-1}, \ldots, v_1)$. The second convolution result and the second reverse sequence are determined as the longitudinal feature sequence.

At the third step, a convolution operation is performed on the image based on the first convolution result and the first reverse sequence in the lateral feature sequence and the second convolution result and the second reverse sequence in the longitudinal feature sequence, to determine a deformation parameter $\alpha:(\alpha_1, \beta_1, \alpha_2, \beta_2)^T$ representing weights of the first convolution result, the first reverse sequence, the second convolution result and the second reverse sequence associated with image deformation.

At the fourth step, the first convolution result, the first reverse sequence, the second convolution result and the second reverse sequence are fused using the formula (1) by means of the weighted sum method and based on the deformation parameter, to obtain an n×1 fused feature $\hat{h}:(\hat{h}_1, \hat{h}_2, \ldots, \hat{h}_n)^T$.

$$[\vec{v}, \bar{v}, \hat{h}, \bar{h}] \times \alpha \quad (1)$$

At the fifth step, the fused feature is subjected to a preset activation function tanh to obtain the image feature h by using the formula (2).

$$h = \tanh([\vec{v}, \bar{v}, \vec{h}, \bar{h}] \times \alpha) \quad (2)$$

At the sixth step, an object in the image is recognized by decoding the image feature.

In the solution, for an inclined object, the object has different components in different angle of view. Therefore, the feature extraction along different angle of views and feature fusion are implemented to obtain the fused feature, i.e., the whole feature information of the object in the angle of views. The activation function is then applied to the fused feature to obtain the image feature that can be matched with the template. Finally, the object is recognized through the decoding. The method does not require advance determination of the angle of the inclined object and thus does not require the generation of various object classifiers for objects with different angles. This simplifies the operations of the object recognition, and improves the efficiency of the object recognition while ensuring the accuracy of the object recognition. In addition, the forward and reverse arrangement of the convolution results in the lateral feature sequence and the longitudinal feature sequence can represent the inclination of the object more intuitively. An convolution operation is applied to the lateral feature sequence and the longitudinal feature sequence to obtain a deformation parameter representing the weights of the lateral feature sequence and the longitudinal feature sequence associated with the image deformation. The features are fused by means of the weighted sum method. This allows the fused feature to reflect the deformation degrees of the object in different directions of angle of views more accurately, which further improves the accuracy of the object recognition.

Figure 6:
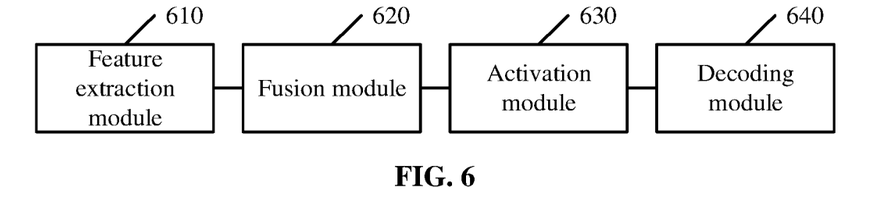
FIG. 6 is a schematic diagram of the structure of an image object recognition apparatus according to an embodiment of the present application.

Corresponding to the embodiments of the method, an embodiment of the present application further provides an image object recognition apparatus. As shown in FIG. 6, the image object recognition apparatus may include a feature extraction module 610, a fusion module 620, an activation module 630 and a decoding module 640.

The feature extraction module 610 is configured for performing feature extraction in the direction of a horizontal angle of view and in the direction of a vertical angle of view of an image respectively, to extract a lateral feature sequence and a longitudinal feature sequence of the image.

The fusion module 620 is configured for fusing the lateral feature sequence and the longitudinal feature sequence to obtain a fused feature.

The activation module 630 is configured for activating the fused feature by using a preset activation function to obtain an image feature.

The decoding module 640 is configured for recognizing an object in the image by decoding the image feature.

In the embodiment of the present application, feature extraction in the direction of the horizontal angle of view and in the direction of the vertical angle of view of the image is performed to extract a lateral feature sequence and a longitudinal feature sequence respectively. The lateral feature sequence and the longitudinal feature sequence are fused to obtain a fused feature. An activation function is applied to the fused feature to obtain an image feature, which is then decoded to recognize an object in the image. For an inclined object, the object has different components in different angle of view. Therefore, the feature extraction along different angle of views and feature fusion are implemented to obtain the fused feature, i.e., the whole feature information of the object in the angle of views. The activation function is then applied to the fused feature to obtain the image feature that can be matched with the template. Finally, the object is recognized through the decoding. The method does not require advance determination of the angle of the inclined object and thus does not require the generation of various object classifiers for objects with different angles. This simplifies the operations of the object recognition, and improves the efficiency of the object recognition while ensuring the accuracy of the object recognition.

Optionally, the fusion module 620 may be specifically configured for concatenating the lateral feature sequence and the longitudinal feature sequence to obtain the fused feature.

The image object recognition apparatus in the embodiment of the present application is an apparatus to which the image object recognition method shown in FIG. 2 is applied. Thus, all embodiments of the image object recognition method shown in FIG. 2 also apply to the image object recognition apparatus, and embodiments of the image object recognition apparatus can achieve the same or similar advantages.

Figure 7:
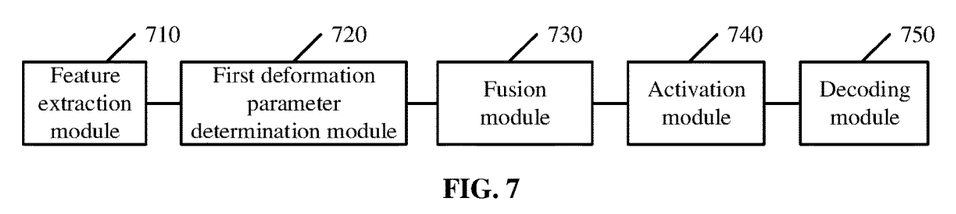
FIG. 7 is another schematic diagram of the structure of an image object recognition apparatus according to an embodiment of the present application.

On the basis of the embodiment shown in FIG. 6, an embodiment of the present application further provides another image object recognition apparatus. As shown in FIG. 7, the image object recognition apparatus may include a feature extraction module 710, a first deformation parameter determination module 720, a fusion module 730, an activation module 740 and a decoding module 750.

The feature extraction module 710 is configured for: performing a convolution operation in the direction of the horizontal angle of view of the image to obtain a first convolution result, which is used as the lateral feature sequence; and performing a convolution operation in the direction of the vertical angle of view of the image to obtain a second convolution result, which is used as the longitudinal feature sequence.

The first deformation parameter determination module 720 is configured for performing a convolution operation on the image based on the lateral feature sequence and the longitudinal feature sequence, to determine a deformation parameter indicating weights of the lateral feature sequence and the longitudinal feature sequence associated with image deformation.

The fusion module 730 is configured for fusing the lateral feature sequence and the longitudinal feature sequence by using a weighted sum method and the deformation parameter to obtain the fused feature.

The activation module 740 is configured for activating the fused feature by using a preset activation function to obtain an image feature.

The decoding module 750 is configured for recognizing an object in the image by decoding the image feature.

In the embodiment of the present application, feature extraction in the direction of the horizontal angle of view and in the direction of the vertical angle of view of the image is performed to extract a lateral feature sequence and a longitudinal feature sequence respectively. The lateral feature sequence and the longitudinal feature sequence are fused to obtain a fused feature. An activation function is applied to the fused feature to obtain an image feature, which is then decoded to recognize an object in the image. For an inclined object, the object has different components in different angle of view. Therefore, the feature extraction along different angle of views and feature fusion are implemented to obtain the fused feature, i.e., the whole feature information of the object in the angle of views. The activation function is then applied to the fused feature to obtain the image feature that can be matched with the template. Finally, the object is recognized through the decoding. The method does not require advance determination of the angle of the inclined object and thus does not require the generation of various object classifiers for objects with different angles. This simplifies the operations of the object recognition, and improves the efficiency of the object recognition while ensuring the accuracy of the object recognition. In addition, an convolution operation is applied to the lateral feature sequence and the longitudinal feature sequence to obtain a deformation parameter representing the weights of the lateral feature sequence and the longitudinal feature sequence associated with the image deformation. The features are fused by means of the weighted sum method. This allows the fused feature to reflect the deformation degrees of the object in different directions of angle of views more accurately, which further improves the accuracy of the object recognition.

Figure 8:
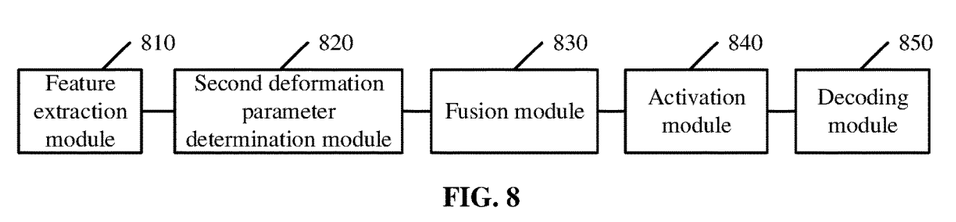
FIG. 8 is yet another schematic diagram of the structure of an image object recognition apparatus according to an embodiment of the present application.

On the basis of the embodiment shown in FIG. 6, an embodiment of the present application further provides another image object recognition apparatus. As shown in FIG. 8, the image object recognition apparatus may include a feature extraction module 810, a second deformation parameter determination module 820, a fusion module 830, an activation module 840 and a decoding module 850.

The feature extraction module 810 is configured for: performing a convolution operation in the direction of the horizontal angle of view of the image to obtain a first convolution result; reversely arranging row vectors in the first convolution result to obtain a first reverse sequence; using the first convolution result and the first reverse sequence as the lateral feature sequence; performing a convolution operation in the direction of the vertical angle of view of the image to obtain a second convolution result; reversely arranging column vectors in the second convolution result to obtain a second reverse sequence; and using the second convolution result and the second reverse sequence as the longitudinal feature sequence.

The second deformation parameter determination module 820 is configured for performing a convolution operation on the image based on the first convolution result and the first reverse sequence in the lateral feature sequence and the second convolution result and the second reverse sequence in the longitudinal feature sequence, to determine a deformation parameter indicating weights of the first convolution result, the first reverse sequence, the second convolution result and the second reverse sequence associated with image deformation.

The fusion module 830 is configured for fusing the first convolution result, the first reverse sequence, the second convolution result and the second reverse sequence by using a weighted sum method and the deformation parameter to obtain the fused feature.

The activation module 840 is configured for activating the fused feature by using a preset activation function to obtain an image feature.

The decoding module 850 is configured for recognizing an object in the image by decoding the image feature.

In the solution, for an inclined object, the object has different components in different angle of view. Therefore, the feature extraction along different angle of views and feature fusion are implemented to obtain the fused feature, i.e., the whole feature information of the object in the angle of views. The activation function is then applied to the fused feature to obtain the image feature that can be matched with the template. Finally, the object is recognized through the decoding. The method does not require advance determination of the angle of the inclined object and thus does not require the generation of various object classifiers for objects with different angles. This simplifies the operations of the object recognition, and improves the efficiency of the object recognition while ensuring the accuracy of the object recognition. In addition, the forward and reverse arrangement of the convolution results in the lateral feature sequence and the longitudinal feature sequence can represent the inclination of the object more intuitively. An convolution operation is applied to the lateral feature sequence and the longitudinal feature sequence to obtain a deformation parameter representing the weights of the lateral feature sequence and the longitudinal feature sequence associated with the image deformation. The features are fused by means of the weighted sum method. This allows the fused feature to reflect the deformation degrees of the object in different directions of angle of views more accurately, which further improves the accuracy of the object recognition.

Figure 9:
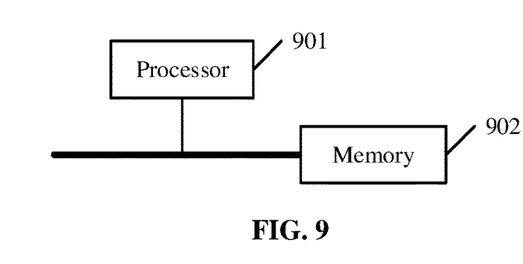
FIG. 9 is a schematic diagram of the structure of a computer device according to an embodiment of the present application.

Further, corresponding to the image object recognition method provided in the above embodiments, an embodiment of the present application provides a computer device. As shown in FIG. 9, the computer device includes a processor 901 and a memory 902. The memory 902 is configured to store a computer program. The processor 901 is configured to, by executing the computer program stored in the memory 902, carry out operations comprising:

performing feature extraction in the direction of a horizontal angle of view and in the direction of a vertical angle of view of an image respectively, to extract a lateral feature sequence and a longitudinal feature sequence of the image; fusing the lateral feature sequence and the longitudinal feature sequence to obtain a fused feature; activating the fused feature by using a preset activation function to obtain an image feature; and recognizing an object in the image by decoding the image feature.

Optionally, for performing the feature extraction in the direction of the horizontal angle of view and in the direction of the vertical angle of view of the image respectively to extract the lateral feature sequence and the longitudinal feature sequence of the image, the processor 901 may specifically performs operations comprising: performing a convolution operation in the direction of the horizontal angle of view of the image to obtain a first convolution result, which is used as the lateral feature sequence; and performing a convolution operation in the direction of the vertical angle of view of the image to obtain a second convolution result, which is used as the longitudinal feature sequence.

Optionally, the processor 901 may further performs an operation of: performing a convolution operation on the image based on the lateral feature sequence and the longitudinal feature sequence, to determine a deformation parameter indicating weights of the lateral feature sequence and the longitudinal feature sequence associated with image deformation.

For fusing the lateral feature sequence and the longitudinal feature sequence to obtain the fused feature, the processor 901 may specifically performs an operation of: fusing the lateral feature sequence and the longitudinal feature sequence by using a weighted sum method and the deformation parameter to obtain the fused feature.

Optionally, for performing the feature extraction in the direction of the horizontal angle of view and in the direction of the vertical angle of view of the image respectively to extract the lateral feature sequence and the longitudinal feature sequence of the image, the processor 901 may specifically perform operations comprising: performing a convolution operation in the direction of the horizontal angle of view of the image to obtain a first convolution result; reversely arranging row vectors in the first convolution result to obtain a first reverse sequence; using the first convolution result and the first reverse sequence as the lateral feature sequence; performing a convolution operation in the direction of the vertical angle of view of the image to obtain a second convolution result; reversely arranging column vectors in the second convolution result to obtain a second reverse sequence; and using the second convolution result and the second reverse sequence as the longitudinal feature sequence.

Optionally, the processor 901 may further perform an operation of: performing a convolution operation on the image based on the first convolution result and the first reverse sequence in the lateral feature sequence and the second convolution result and the second reverse sequence in the longitudinal feature sequence, to determine a deformation parameter indicating weights of the first convolution result, the first reverse sequence, the second convolution result and the second reverse sequence associated with image deformation.

For fusing the lateral feature sequence and the longitudinal feature sequence to obtain the fused feature, the processor 901 may specifically perform an operation of: fusing the first convolution result, the first reverse sequence, the second convolution result and the second reverse sequence by using a weighted sum method and the deformation parameter to obtain the fused feature.

Optionally, for fusing the lateral feature sequence and the longitudinal feature sequence to obtain the fused feature, the processor 901 may specifically perform an operation of: concatenating the lateral feature sequence and the longitudinal feature sequence to obtain the fused feature.

The memory 902 and the processor 901 can transmit data to each other through a wired connection or a wireless connection, and the computer device can communicate with other devices through a wired communication interface or a wireless communication interface. It should be noted that FIG. 9 shows an example of data transmission between the processor 901 and the memory 902 through a bus, which is not intended to limit the transmission manner.

The memory may include RAMs (Random Access Memory), or may include NVMs (Non-Volatile Memory), for example at least one disk memory. Optionally, the memory may also be at least one storage located away from the processor.

The processor may be a general processor including CPU (Central Processing Unit), NP (Network Processor) or the like. The processor may also be a DSP (Digital Signal Processor), ASIC (Application Specific Integrated Circuit), FPGA (Field-Programmable Gate Array) or other programmable logic components, discrete gates or transistor logic components, or discrete hardware assemblies.

In this embodiment, the processor of the computer device reads and executes the computer program stored in the memory to perform the image object recognition method provided by the embodiments of the present application, and can achieve same or similar advantages as the method embodiments. For an inclined object, the object has different components in different angle of view. Therefore, the feature extraction along different angle of views and feature fusion are implemented to obtain the fused feature, i.e., the whole feature information of the object in the angle of views. The activation function is then applied to the fused feature to obtain the image feature that can be matched with the template. Finally, the object is recognized through the decoding. The method does not require advance determination of the angle of the inclined object and thus does not require the generation of various object classifiers for objects with different angles. This simplifies the operations of the object recognition, and improves the efficiency of the object recognition while ensuring the accuracy of the object recognition.

Furthermore, corresponding to the image object recognition method provided by the above embodiments, an embodiment of the present application provides a computer readable storage medium having a computer program stored thereon which, when executed, performs the image object recognition method provided by the embodiments of the present application.

In this embodiment, the computer readable storage medium stores a computer program performing, when executed, the image object recognition method provided by the embodiment of the present application, and thus can achieve same or similar advantages as the method embodiments. For an inclined object, the object has different components in different angle of view. Therefore, the feature extraction along different angle of views and feature fusion are implemented to obtain the fused feature, i.e., the whole feature information of the object in the angle of views. The activation function is then applied to the fused feature to obtain the image feature that can be matched with the template. Finally, the object is recognized through the decoding. The method does not require advance determination of the angle of the inclined object and thus does not require the generation of various object classifiers for objects with different angles. This simplifies the operations of the object recognition, and improves the efficiency of the object recognition while ensuring the accuracy of the object recognition.

Moreover, corresponding to the image object recognition method provided by the above embodiments, an embodiment of the present application provides an application program that, when executed, carries out the image object recognition method provided by the embodiments of the present application.

In this embodiment, the application program performs, when executed, the image object recognition method provided by the embodiment of the present application, and thus can achieve same or similar advantages as the method embodiments. For an inclined object, the object has different components in different angle of view. Therefore, the feature extraction along different angle of views and feature fusion are implemented to obtain the fused feature, i.e., the whole feature information of the object in the angle of views. The activation function is then applied to the fused feature to obtain the image feature that can be matched with the template. Finally, the object is recognized through the decoding. The method does not require advance determination of the angle of the inclined object and thus does not require the generation of various object classifiers for objects with different angles. This simplifies the operations of the object recognition, and improves the efficiency of the object recognition while ensuring the accuracy of the object recognition.

The embodiments of the computer device, the computer readable storage medium and the application program are described briefly, since the method contents involved thereof are substantially similar to the foregoing embodiment of the method, and the related contents can refer to the description of the embodiment of the method.

It should be noted that the relationship terms used herein, such as "first", "second" and the like, are only to distinguish one entity or operation from another entity or operation, but do not necessarily require or imply that there is any actual relationship or order between these entities or operations. Moreover, the terms "include", "comprise", or any variants thereof are intended to cover a non-exclusive inclusion, such that processes, methods, articles or devices including a series of elements include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices including the listed elements.

All of the embodiments in the description are described in a correlated manner, and description of a component in an embodiment can apply to another containing the same. In addition, the description for each embodiment focuses on the differences from other embodiments. In particular, a brief description is provided to embodiments of the apparatus, computer device, computer-readable storage medium, and application program in view of their resemblance with the method embodiments. Relevant details can be known with reference to the description of the method embodiments.

The embodiments described above are only preferable embodiments of the present application, and are not intended to limit the scope of protection of the present application. Any modifications, alternatives, improvements, or the like within the spirit and principle of the present application shall be included within the scope of protection of the present application.

The invention claimed is:

1. An image object recognition method, comprising:
performing feature extraction in a lateral direction and in a longitudinal direction of an image respectively, to extract a lateral feature sequence and a longitudinal feature sequence of the image;
fusing the lateral feature sequence and the longitudinal feature sequence to obtain a fused feature;
activating the fused feature by using a preset activation function to obtain an image feature; and
recognizing an object in the image by decoding the image feature;
wherein performing the feature extraction in the lateral direction and in the longitudinal direction of the image respectively to extract the lateral feature sequence and the longitudinal feature sequence of the image, comprises:
performing a convolution operation in the lateral direction of the image to obtain a first convolution result;
reversely arranging row vectors in the first convolution result to obtain a first reverse sequence;
using the first convolution result and the first reverse sequence as the lateral feature sequence; performing a convolution operation in the longitudinal direction of the image to obtain a second convolution result;
reversely arranging column vectors in the second convolution result to obtain a second reverse sequence; and
using the second convolution result and the second reverse sequence as the longitudinal feature sequence.

2. The method according to claim 1, wherein before fusing the lateral feature sequence and the longitudinal feature sequence to obtain the fused feature, the method further comprises:
performing a convolution operation on the image based on the lateral feature sequence and the longitudinal feature sequence, to determine a deformation parameter indicating weights of the lateral feature sequence and the longitudinal feature sequence associated with image deformation; and wherein
fusing the lateral feature sequence and the longitudinal feature sequence to obtain the fused feature, comprises:
fusing the lateral feature sequence and the longitudinal feature sequence by using a weighted sum method and the deformation parameter to obtain the fused feature.

3. The method according to claim 1, wherein before fusing the lateral feature sequence and the longitudinal feature sequence to obtain the fused feature, the method further comprises:
performing a convolution operation on the image based on the first convolution result and the first reverse sequence in the lateral feature sequence and the second convolution result and the second reverse sequence in the longitudinal feature sequence, to determine a deformation parameter indicating weights of the first convolution result, the first reverse sequence, the second convolution result and the second reverse sequence associated with image deformation; and wherein fusing the lateral feature sequence and the longitudinal feature sequence to obtain the fused feature, comprises:

fusing the first convolution result, the first reverse sequence, the second convolution result and the second reverse sequence by using a weighted sum method and the deformation parameter to obtain the fused feature.

4. The method according to claim 1, wherein fusing the lateral feature sequence and the longitudinal feature sequence to obtain the fused feature, comprises:

concatenating the lateral feature sequence and the longitudinal feature sequence to obtain the fused feature.

5. A computer device, comprising a processor and a memory; wherein the memory is configured to store a computer program; and the processor is configured to, when executing the computer program stored on the memory, perform operations comprising:

performing feature extraction in a lateral direction and in a longitudinal direction of an image respectively, to extract a lateral feature sequence and a longitudinal feature sequence of the image;

fusing the lateral feature sequence and the longitudinal feature sequence to obtain a fused feature;

activating the fused feature by using a preset activation function to obtain an image feature; and recognizing an object in the image by decoding the image feature;

wherein performing the feature extraction in the lateral direction and in the longitudinal direction of the image respectively to extract the lateral feature sequence and the longitudinal feature sequence of the image, comprises:

performing a convolution operation in the lateral direction of the image to obtain a first convolution result;

reversely arranging row vectors in the first convolution result to obtain a first reverse sequence;

using the first convolution result and the first reverse sequence as the lateral feature sequence;

performing a convolution operation in the longitudinal direction of the image to obtain a second convolution result;

reversely arranging column vectors in the second convolution result to obtain a second reverse sequence; and using the second convolution result and the second reverse sequence as the longitudinal feature sequence.

6. The computer device according to claim 5, wherein the processor further performs an operation of:

performing a convolution operation on the image based on the lateral feature sequence and the longitudinal feature sequence, to determine a deformation parameter indicating weights of the lateral feature sequence and the longitudinal feature sequence associated with image deformation; and wherein for fusing the lateral feature sequence and the longitudinal feature sequence to obtain the fused feature, the processor further performs an operation of:

fusing the lateral feature sequence and the longitudinal feature sequence by using a weighted sum method and the deformation parameter to obtain the fused feature.

7. The computer device according to claim 5, wherein the processor further performs an operation of:

performing a convolution operation on the image based on the first convolution result and the first reverse sequence in the lateral feature sequence and the second convolution result and the second reverse sequence in the longitudinal feature sequence, to determine a deformation parameter indicating weights of the first convolution result, the first reverse sequence, the second convolution result and the second reverse sequence associated with image deformation; and wherein for fusing the lateral feature sequence and the longitudinal feature sequence to obtain the fused feature, the processor further performs an operation of:

fusing the first convolution result, the first reverse sequence, the second convolution result and the second reverse sequence by using a weighted sum method and the deformation parameter to obtain the fused feature.

8. The computer device according to claim 5, wherein for fusing the lateral feature sequence and the longitudinal feature sequence to obtain the fused feature, the processor further performs an operation of:

concatenating the lateral feature sequence and the longitudinal feature sequence to obtain the fused feature.

9. A non-transitory computer readable storage medium, having stored thereon a computer program that, when executed by a processor, causes the processor to perform operations comprising:

performing feature extraction in a lateral direction and in a longitudinal direction of an image respectively, to extract a lateral feature sequence and a longitudinal feature sequence of the image;

fusing the lateral feature sequence and the longitudinal feature sequence to obtain a fused feature;

activating the fused feature by using a preset activation function to obtain an image feature; and recognizing an object in the image by decoding the image feature;

wherein performing the feature extraction in the lateral direction and in the longitudinal direction of the image respectively to extract the lateral feature sequence and the longitudinal feature sequence of the image, comprises:

performing a convolution operation in the lateral direction of the image to obtain a first convolution result;

reversely arranging row vectors in the first convolution result to obtain a first reverse sequence;

using the first convolution result and the first reverse sequence as the lateral feature sequence;

performing a convolution operation in the longitudinal direction of the image to obtain a second convolution result;

reversely arranging column vectors in the second convolution result to obtain a second reverse sequence; and using the second convolution result and the second reverse sequence as the longitudinal feature sequence.

10. The storage medium according to claim 9, wherein before fusing the lateral feature sequence and the longitudinal feature sequence to obtain the fused feature, the operations further comprise:

performing a convolution operation on the image based on the lateral feature sequence and the longitudinal feature sequence, to determine a deformation parameter indicating weights of the lateral feature sequence and the longitudinal feature sequence associated with image deformation; and wherein fusing the lateral feature sequence and the longitudinal feature sequence to obtain the fused feature, comprises:
  fusing the lateral feature sequence and the longitudinal feature sequence by using a weighted sum method and the deformation parameter to obtain the fused feature.

11. The storage medium according to claim 9, wherein before fusing the lateral feature sequence and the longitudinal feature sequence to obtain the fused feature, the operations further comprise:
  performing a convolution operation on the image based on the first convolution result and the first reverse sequence in the lateral feature sequence and the second convolution result and the second reverse sequence in the longitudinal feature sequence, to determine a deformation parameter indicating weights of the first convolution result, the first reverse sequence, the second convolution result and the second reverse sequence associated with image deformation; and wherein
  fusing the lateral feature sequence and the longitudinal feature sequence to obtain the fused feature, comprises:
  fusing the first convolution result, the first reverse sequence, the second convolution result and the second reverse sequence by using a weighted sum method and the deformation parameter to obtain the fused feature.

12. The storage medium according to claim 9, wherein fusing the lateral feature sequence and the longitudinal feature sequence to obtain the fused feature, comprises:
  concatenating the lateral feature sequence and the longitudinal feature sequence to obtain the fused feature.

* * * * *